United States Patent [19]

Menefee et al.

[11] Patent Number: 5,403,740
[45] Date of Patent: Apr. 4, 1995

[54] BIODEGRADABLE COMPOST BINS

[76] Inventors: Jay Menefee; Michael T. Menefee, both of 8035 Thornapple Dr., Novelty, Ohio 44072

[21] Appl. No.: 918,575

[22] Filed: Jul. 22, 1992

Related U.S. Application Data

[63] Continuation-in-part of Ser. No. 868,002, Apr. 14, 1992, abandoned.

[51] Int. Cl.6 .............................................. C12M 1/00
[52] U.S. Cl. ..................................... 435/287; 435/313; 422/184; 229/117.01; 229/93; 229/4.5
[58] Field of Search ............... 435/287, 299, 313, 316; 422/184; 405/128, 129; 428/34.2, 34.3, 36.9, 12; 52/169.11, 169.14; 71/8, 9, 901; 220/484, 908, DIG. 30, 4.04, 4.34, 4.08, 4.09, 4.33, 4.28, 493, 489, 375, 913; 241/DIG. 38; 423/DIG. 18; 383/1, 104, 105, 107; 229/17.01, 4.5, 931, 93

[56] References Cited

U.S. PATENT DOCUMENTS

| | | | |
|---|---|---|---|
| 3,349,991 | 10/1967 | Kessler | 493/194 |
| 3,934,999 | 1/1976 | Meier | 71/9 |
| 4,125,394 | 11/1978 | Wilson | 71/9 |
| 4,984,561 | 1/1991 | Warrington | 71/9 |
| 5,052,570 | 10/1991 | Johansen | 71/9 |

FOREIGN PATENT DOCUMENTS

| | | |
|---|---|---|
| 273433 | 11/1989 | German Dem. Rep. . |
| 3517523 | 12/1986 | Germany . |
| 3726614 | 12/1987 | Germany . |
| 4019771 | 1/1992 | Germany . |
| 2038304 | 7/1980 | United Kingdom . |

*Primary Examiner*—William H. Beisner
*Attorney, Agent, or Firm*—Renner, Otto, Boisselle & Sklar

[57] ABSTRACT

A biodegradable compost bin comprises a housing made of an organic membrane which may be folded into a relatively small, compact shape for ease of storage and shipment and easily popped open when ready to use. The housing has opposite open ends, one of which is adapted to be positioned on a supporting surface so that the housing forms an enclosure for receipt of the compostable waste materials through the upper open end.

31 Claims, 2 Drawing Sheets

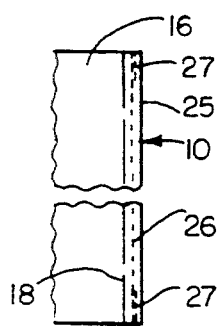
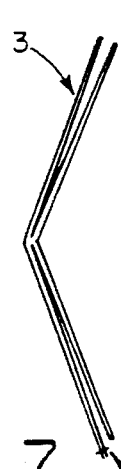
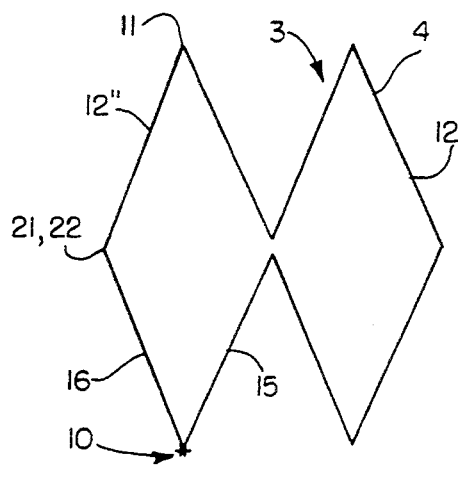
FIG. 6   FIG. 7   FIG. 8
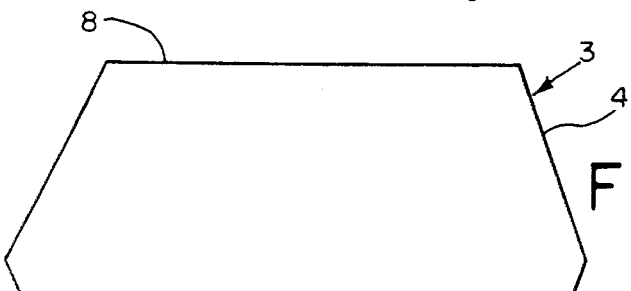
FIG. 9
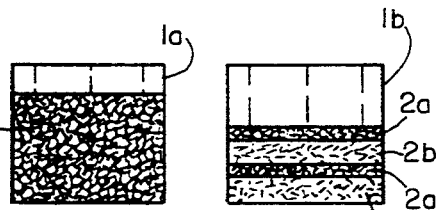
FIG. 11
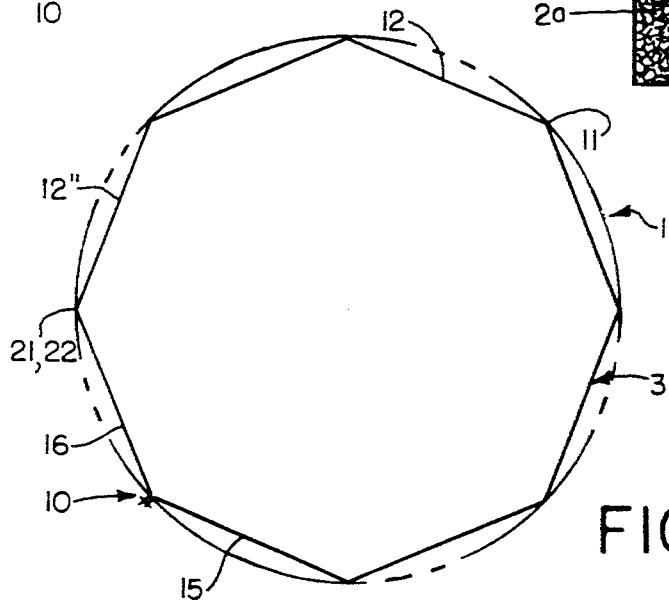
FIG. 10

BIODEGRADABLE COMPOST BINS

CROSS-REFERENCE TO RELATED APPLICATIONS

This application is a continuation-in-part of U.S. patent application Ser. No. 07/868,002, filed Apr. 14, 1992, now abandoned.

FIELD OF THE INVENTION

This invention relates generally to biodegradable compost bins which provide homeowners with a proper environment and containment for leaves, grass clippings, green trimmings, weeds and other compostable waste materials over an extended period of time allowing the materials to decompose into compost which can be used to improve the soil in gardens and flower beds and the like.

BACKGROUND OF THE INVENTION

A growing number of states and local communities are refusing to accept lawn and garden waste materials in landfills. In the past, these materials have accounted for as much as 20% of the landfill contents.

Only a few municipalities provide for community pick-up and composting of lawn and garden waste materials. Thus a large number of homeowners are faced with the problem of how to dispose of these materials.

A number of devices are available which allow the homeowner to compost lawn and garden waste materials in the homeowner's own yard. Such materials will also compost when left in an open pile. However, open piles are not very practical for suburban yards since they occupy a large area, are unsightly, and frequently contain loose material that can be blown into adjacent areas.

The most popular do-it-yourself composting devices currently available are wire or plastic cages, plastic bins, and plastic or metal tumblers. Wire or plastic cages are relatively inexpensive. However, their openness allows too much moisture to escape, slowing or even stopping the composting process. Also, they are relatively difficult to fill with composting materials and empty after composting has taken place. Moreover, in time these cages themselves present a disposal problem.

Bins and tumblers present an acceptably neat appearance and provide a good environment for the composting process, but are relatively expensive. Also, because of their size, they are expensive to ship, difficult to store, and complicated for the homeowner to put together. Moreover, while the tumbler type device is effective for composting these materials in a relatively short period of time, it requires much more attention than most homeowners are willing to give.

SUMMARY OF THE INVENTION

The present invention provides biodegradable compost bins which are relatively inexpensive and light in weight, and are easily collapsed or folded for ease of storage and shipment. Also, the compost bins, being made of a biodegradable material, can easily be removed from the composted materials contained therein after a full composting season and disposed of by turning them into compost.

In accordance with one aspect of the present invention, the compost bins comprise a housing made of an organic membrane having opposite open ends. One of the ends is adapted to be positioned on a supporting surface such that the housing forms an enclosure for receipt of compostable waste materials through the other (upper) open end.

In accordance with another aspect of the invention, the organic membrane desirably has a water vapor transmission rate that allows sufficient water vapor to escape from the compostable waste materials adjacent the interior surface of the membrane within a few hours after the compostable waste materials have been soaked with water to keep the membrane substantially intact to contain the compostable waste materials therewithin throughout a full composting season.

In accordance with another aspect of the invention, the water transmission rate of the membrane is desirably such that the moisture content of the membrane is reduced to approximately 20% or less within a few hours after the compostable waste materials within the enclosure has been soaked with water.

In accordance with another aspect of the invention, the water transmission rate of the membrane is also desirably sufficiently low to prevent water vapor from escaping from the compostable waste materials located further inwardly of the interior surface of the membrane through the membrane.

In accordance with another aspect of the invention, the membrane is desirably made of a paper material having a pound weight of between approximately 50 and 90.

In accordance with another aspect of the invention, the enclosure formed by the membrane is desirably substantially cylindrical in shape when filled with compostable waste materials.

In accordance with another aspect of the invention, the enclosure formed by the membrane desirably has a height to diameter ratio of approximately one.

In accordance with another aspect of the invention, the machine direction of the paper membrane from which the bin housing is made desirably extends in a direction generally circumferential of the open ends of the housing around the periphery thereof.

In accordance with another aspect of the invention, the membrane is desirably made of a single strip of organic material having a plurality of spaced apart fold lines extending generally perpendicular to opposite side edges of the strip thus dividing the strip into a series of interconnected panels which are foldable together to facilitate storage and shipment of the membrane.

In accordance with another aspect of the invention, a first panel portion at one end of the strip and each successive panel portion are desirably foldable together in accordion fashion from one end toward the other end except for a last panel portion at the other end which is foldable back against an adjacent panel portion and the strip ends are desirably either adhesively bonded or stitched together for ease of joining the strip ends together as well as to facilitate storage and shipment of the membrane.

In accordance with another aspect of the invention, a plurality of aeration holes are desirably provided in the lower portion of the membrane closest to the supporting surface to enhance the water vapor transmission rate of the lower portion and aid in aerating the interior of the enclosure.

In accordance with another aspect of the invention, a method of composting compostable waste materials is provided by positioning one end of a housing having opposite open ends on a supporting surface to form an enclosure, and introducing compostable waste materials into the enclosure through the other open end, wherein the housing is made of an organic membrane having a water vapor transmission rate that allows sufficient water vapor to escape from the compostable waste materials adjacent the interior surface of the membrane within a few hours after the compostable waste materials within the enclosure have been soaked with water to keep the membrane substantially intact throughout a full composting season.

In accordance with another aspect of the invention, the organic membrane from which the housing is made desirably has a water transmission rate sufficiently low to prevent water vapor from escaping from the compostable waste materials located further inwardly of the interior surface of the membrane through the membrane.

In accordance with another aspect of the invention, the method for composting compostable waste materials may utilize one or more enclosures for storing leaves, and one or more additional enclosures for receiving newly cut grass clippings and the like which are layered with leaves taken from the first mentioned enclosure or enclosures to promote the composting process.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 6 is a fragmentary side elevation view of the stitched joint of the folded membrane of FIG. 5 as generally seen from the plane of the line 6—6 thereof;

FIGS. 7 through 10 are schematic top plan views showing how the folded membrane of FIG. 5 can be progressively popped open to provide a generally octagonal shape housing, and when filled with compostable waste materials, a generally cylindrical shape housing; and FIG. 11 is a reduced schematic vertical section through two compost bins in accordance with this invention, one containing a stored supply of leaves, and the other containing plural layers of newly cut grass clippings and leaves taken from the first bin to promote the composting process.

DETAILED DESCRIPTION OF THE PREFERRED EMBODIMENTS

Figure 1:
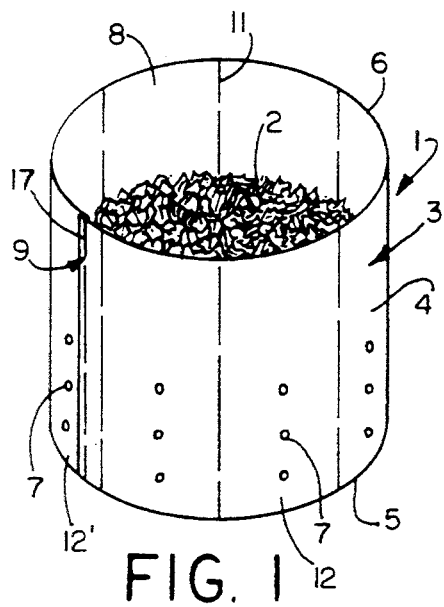
FIG. 1 is a perspective view of one form of biodegradable compost bin in accordance with the present invention.

Referring now in detail to the drawings, and initially to FIG. 1, there is shown one form of compost bin 1 in accordance with this invention partially filled with compostable lawn and garden waste materials 2 such as leaves, grass clippings, green trimmings, weeds, dead garden plants, etc. Such a compost bin is primarily designed for use by homeowners, to provide a proper environment and containment for the compostable waste materials over an extended period of time allowing the materials to decompose to become valuable compost which can be used to improve the soil in gardens and flower beds and the like.

The compost bin 1 comprises a housing 3 formed from an organic membrane 4 having certain properties as described hereafter. Both ends 5, 6 of the housing are desirably open. When the end 5 is positioned on a supporting surface such as the ground, the housing 3 forms an enclosure into which compostable waste materials may be introduced through the other (upper) open end 6 thereof. It is best to place the housing on well drained, level ground rather than on a paved or gravel surface so that moisture and microorganisms can move up into the bin 1 to cause decomposition.

To ensure that the compost pile 2 contained within the bin 1 does not dry out too much during the Spring and Summer months when composting is taking place, the compost pile should desirably be kept about as moist as a wrung-out sponge. If normal rainfall is not adequate for that purpose, the compost pile should be periodically watered to maintain the desired moisture content within the pile. As a rule of thumb, the compost pile should be watered as often as the lawn.

At the same time, it is important that the moisture content of the organic membrane 4 and the compostable material 2 immediately adjacent the interior surface of the membrane be reduced within a few hours after watering to a safe level in order to maintain the strength and integrity of the membrane to contain the compostable material therewithin during a full composting season. This is accomplished in accordance with the present invention by using an organic membrane 4 for the bin housing 3 having a water vapor transmission rate (WVTR) sufficient to allow water to escape as vapor through the membrane such that the membrane and the compostable material immediately adjacent the interior surface of the membrane will dry in a few hours after watering to a point of approximately 20% moisture content or less. At this moisture content level, virtually all biodegradation of organic materials is curtailed whereby the membrane will maintain its strength and integrity.

If the water vapor transmission rate of the membrane is too low, the moist compostable waste materials within the bin will keep the membrane wetted and will cause the membrane to decay too quickly. On the other hand, if the water vapor transmission rate of the membrane is excessively high, the bin contents will tend to dry out too deeply into the bin interrupting the composting process and delaying the decay of the compostable waste materials.

The housing 3 does not require very much tensile strength. However, considerable compressive stress is placed on the interior surface of the housing since the waste material contents, when damp, are very heavy and tend to wedge or lock against such interior surface and force the housing downward as the contents settle. If the membrane from which the housing is made has insufficient compressive strength, the housing will settle downward at substantially the same rate as the waste material contents, exhibiting billow or accordion type deformations, thus only allowing the housing to be filled once.

Commercial paper making machines typically produce paper that has considerably more strength in the "machine direction" (the direction that the paper comes off the machine) than in the "cross machine direction" (the direction perpendicular to the machine direction). The present invention can take advantage of this characteristic by utilizing paper for the organic membrane that has been cut such that the machine direction of the paper extends in a direction generally perpendicular to the side edges of the membrane which form the open ends 5, 6 of the housing 3.

Limited field trials have shown that making the bin housing 3 out of two-ply 50 pound kraft paper produces marginal results, since it was found that the water vapor transmission rate of such paper is sufficiently high that it allows drying through the membrane approximately six to eight inches into the bin contents. Also, the compressive stress of a membrane housing made of two-ply 50 pound kraft paper, when filled with compostable waste materials and wetted, is insufficient to keep the housing from settling downward at substantially the same rate as the waste materials, even when the machine direction of the paper is generally perpendicular to the ends of the housing.

Also based on limited field trials, bins made of two-ply 70 pound kraft paper were found to be effective under ideal circumstances but were marginal. The compressive stress of 70 pound kraft paper was found to stand up better against settling. Also the WVTR was less, allowing drying through the membrane housing only approximately three to six inches into the bin contents.

Limited field trials showed that bins made of 69 pound linerboard performed much better, in that they exhibited sufficient compressive strength to prevent the housing from settling down when filled with waste and wetted, especially when the paper was cut so that the machine direction of the paper was generally perpendicular to the open ends of the housing.

However, because of the production process normally used to make paper, it was subsequently discovered that some paper lots have a tendency to more easily crease in the machine direction than in the cross direction. It has been found that this tendency can cause partially filled compost bins that have been fabricated from paper cut so that the machine direction of the paper was generally perpendicular to the open ends of the housing to form creases in the vertical direction in the area above the bin contents and fold over to form a closure over the top of the bin. Such creases are undesirable to the extent that the resulting loss of cylindrical shape seals off the bin contents from the rain needed to keep the bin contents at the desired moisture level and makes it difficult to further fill the bins with compostable waste materials. One way to overcome this problem is to utilize paper for the organic membrane that has been cut such that the machine direction of the paper extends in a direction generally circumferential of the open ends of the housing around the periphery thereof.

When the paper membrane is thus oriented, it loses its tendency to form creases in the vertical direction in the area above the bin contents and fold over to form a closure over the top of the bin. A disadvantage in orienting the machine direction of the membrane this way is that it causes the bin to lose some of its compressive strength. However, this loss of compressive strength can be adequately compensated for by increasing the thickness or weight of the membrane, for example, from 69 pound linerboard to 90 pound linerboard.

The water vapor transmission rate of bins made for example of 69 pound and 90 pound linerboard was also found to be much better than both 50 and 70 pound two-ply kraft paper, in that both 69 pound and 90 pound linerboard only allowed drying through the membrane approximately one to two inches into the bin contents, which was sufficient to prevent the housing from decaying too quickly.

Using heavier paper will increase the compressive strength of the bin. However, heavier paper is more costly and may exhibit an insufficient water vapor transmission rate to prevent the membrane from decaying too quickly to remain substantially intact throughout a full composting season.

To assist in the drying out of the lower portion of the housing 3 closest to the ground, which is normally exposed to more moisture than the upper portion, and to aid in aerating the interior of the housing, a plurality of rows of aeration holes 7 are desirably provided in such lower portion around the entire periphery of the housing (see FIG. 1).

While the field trials described above were limited to using membranes made from softwood pulp fiber, it should be possible to make the housing of the present invention out of membranes made of other biodegradable fibers as well. Paper membranes have been made, for example, from the fibers of hardwood, cotton, flax, jute, ramie, hemp, straw, rice hulls, bagasse, bamboo, esparto, rushes, corn stalks, cane and many other natural organic fibers. As long as these fibers can be formed into membranes having the desired physical properties, membranes made of these fibers should also be usable to form bin housings in accordance with the present invention.

The physical and aesthetic properties of the membranes can also be enhanced by applying various coatings and additives to the membranes. Based on limited field trials, it was found that inks, dyes, light waxes, lacquers, resins, alumina compounds, urea compounds and polyvinyl acetate based glues can also be used to enhance the physical and aesthetic properties of the membranes without adversely affecting biodegradation of the compost bins after they have served their intended purpose. Various resins and alumina compounds are commonly used as sizing materials to increase stiffness and reduce wettability. Other resins and compounds are also used as additives to increase wet-strength properties. Moreover, it is common to laminate polymer coatings onto paper to reduce water transmission and/or water vapor transmission rates. However, as long as the membranes that are used to make bin housings in accordance with the present invention exhibit the desired physical properties described above, it is preferred that no coatings or additives other than possibly dyes or inks be used to achieve an attractive appearance or a suitable glue be used to join the ends of the membranes together to form the housings.

Preferably, the bin 1 is substantially cylindrical in shape to minimize the surface area of the bin for a given volume. Also, the height to diameter ratio of the bin is desirably approximately one to reduce the amount of moisture escaping from the bin except through the open top and a few inches into the bin contents through the permeable membrane 4.

Placing a lid over the top of the bin 1 would reduce the amount of moisture loss through the top. However, a lid would interfere with the escape of gases and introduction of oxygen into the composting pile. Also, a lid would keep rain water out, which would be undesirable.

Providing a bin with an open bottom has the advantage that it allows for better drainage so that the membrane housing can dry out more rapidly. Also, providing the housing with an open bottom makes it easier to fold. If the housing were provided with a paper bottom, the bottom would decompose in a matter of a few weeks. The housing itself decomposes very slowly because of the manner in which it dries out as previously described.

In one form of the invention disclosed herein, the bin housing 4 is made from a sheet 8 of 90 pound linerboard having a length of approximately 110 inches and a height of approximately 32 inches. The machine direction of the linerboard desirably extends in a direction generally circumferential of the open ends of the housing around the periphery thereof to eliminate the tendency of the linerboard to form creases in the vertical direction in the area above the bin contents and fold over to form a closure over the top of the bin as previously described.

The ends of the linerboard are suitably joined together to form a substantially cylindrical housing 3 for example approximately 34 inches in diameter and 32 inches high.

In the embodiment shown in FIGS. 1–4, the ends of the linerboard sheet 8 are joined together with approximately a two inch overlap glue joint 9 using a suitable adhesive such as polyvinylacetate adhesive.

However, it was discovered that if standard production equipment normally available in the paper fabrication industry is used to make large production runs of the bin housings in accordance with the present invention, it is difficult to control the integrity of the glue joint. To provide a much more reliable joint over the long periods of time during which the joint must maintain its integrity, a stitched joint 10, schematically shown in FIGS. 5–10, is desirably used to join the ends of the membrane together instead of a glued joint.

To facilitate storage and shipment of the housing, before the ends of the sheet are joined together, the sheet is scored at spaced apart intervals along the length thereof to provide a plurality of spaced apart fold lines extending generally perpendicular to opposite side edges of the sheet thus dividing the sheet into a series of interconnected panels which are foldable together as described hereafter.

Figure 2:
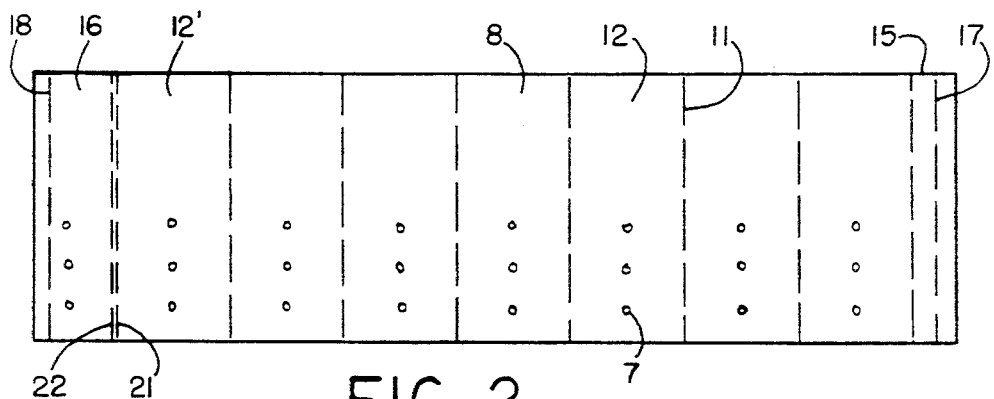
FIG. 2 is a schematic side elevation view of an elongated organic membrane or sheet from which the compost bin of FIG. 1 is made, the membrane having a plurality of spaced apart score lines or fold lines along the length thereof dividing the membrane into a plurality of panels or panel portions which may be folded together for ease of joining the ends of the membrane together and for ease of shipment and storage.

FIG. 2 shows the sheet 8 laying flat with the various score lines 11 illustrated by dash lines. Also, FIG. 2 shows several rows of aeration holes 7 therein. When the sheet 8 used to make the bin housing 3 of the present invention is 110 inches long and 32 inches wide as previously described, sufficient score lines are desirably provided to divide the sheet into eight panels 12 each approximately 13 15/32 inches wide and 32 inches high.

Figure 4:
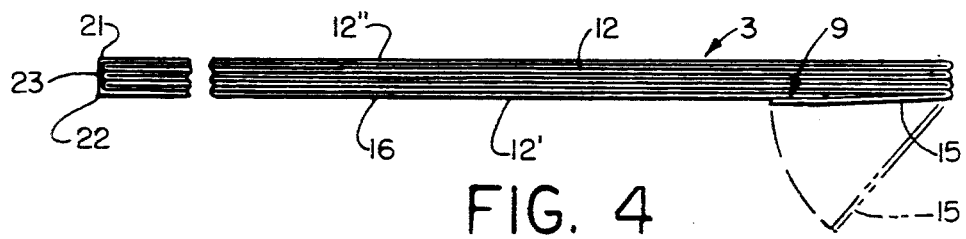
FIG. 4 is an enlarged schematic top plan view of the membrane similar to FIG. 3, but showing the panels completely folded together with two end panel portions overlapping each other and adhesively joined together.

If the ends of the sheet are joined together by means of a glue joint 9 as schematically shown in FIGS. 1 and 4, one of the panels 12 will include the glue joint, which desirably has about a two inch overlap as aforesaid. To provide for such an overlap, during the manufacturing process, the sheet 8 is provided with a first panel portion 15 at one end having a length, for example, of approximately five inches, and a second panel portion 16 at the other end having a length of approximately 10 15/32 inches. Accordingly, when these two panel portions are joined together with a two inch overlap glue joint, they will combine to provide a single panel 12' having the same desired overall dimensions as the other panels 12.

Also, additional score lines 17, 18 are desirably provided approximately two inches in from both ends of the sheet 8 as further schematically illustrated in FIGS. 1 and 2 to prevent any stress build-up in the adhesive joint 9 when the folded housing is opened up into a generally cylindrical shape as shown in FIG. 1. In addition, two closely spaced apart score lines/fold lines 21, 22 are desirably provided between the lastmost panel portion 16 and the next to last panel 12" to provide a relatively wide fold 23 having a width, for example, of approximately 0.250 inches thereat to accommodate all of the other panels 12 between the next to last panel 12" and the panel 12' formed by adhesively joining the first and last panel portions 15, 16 together as schematically shown in FIG. 4.

Figure 3:
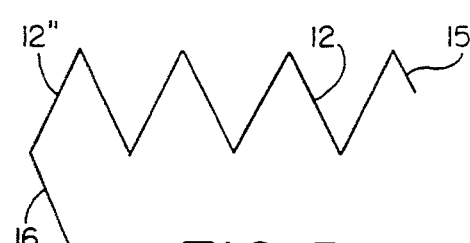
FIG. 3 is a schematic top plan view of the membrane of FIG. 2 showing the various panels partially folded together in accordion-like fashion.

FIG. 3 schematically shows how the first panel portion 15 and each of the panels 12, 12" are successively folded together in accordion fashion from the first end toward the other end, whereas FIG. 4 schematically shows how the last panel portion 16 at the other end is folded back against the other panels 12 and adhesively bonded to the first panel portion 15 after all of the panels 12 are folded into the enlarged fold 23.

Figure 5:
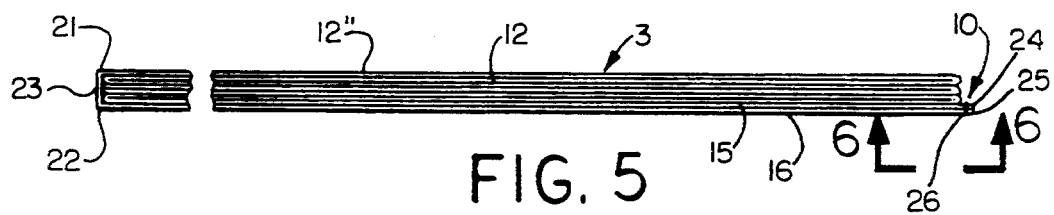
FIG. 5 is an enlarged schematic top plan view of a folded membrane similar to FIG. 2 but in which opposite ends of the membrane are joined together by stitching.

If a stitched joint 10 is to be provided, both the first panel portion 15 and the last panel portion 16 are desirably made slightly longer than the other panels 12, 12', for example, approximately one-quarter inch to three-eighths inch longer. Accordingly, after the first panel portion 15 and each successive panel portion 12, 12' except for the last panel portion 16 are folded together in accordion fashion, the last panel portion 16 is folded back against the first panel portion 15 and the slightly protruding ends 24, 25 of the first and last panel portions 15, 16 are stitched together while the first and last panel portions are laying flat up against each other as schematically shown in FIGS. 5 and 6. The thread 26 used to make the stitched joint 10 is desirably a relatively heavy biodegradable thread such as cotton or rayon. Also, the ends 27 of the stitched joint 10 (adjacent the open ends of the housing) are back-stitched as shown in FIG. 6 to prevent the stitching from being inadvertently pulled out. Additional score lines 17, 18 are desirably provided just inside the stitched joint 10 (i.e. approximately one-quarter inch to three-eighths inch from both ends of the sheet) to minimize the stress on the stitched joint as the housing 3 is opened up to form a bin as described hereafter.

When the bin housings 3 are folded as schematically shown in FIGS. 4 and 5, each housing will take up very little storage space. In fact, several thousand such housings can be packaged on a single industrial pallet. Moreover, as many as eighty such housings can be attractively displayed in two stacks in a floor space of as little as 19 inches by 32 inches.

Such bins have the further advantage that they require no assembly. Moreover, because of their unique "accordion-fold" pattern, the bins can easily be progressively popped open as schematically shown in FIGS. 7 through 10 readying the bins for filling with compostable waste materials.

When the bins are first opened up, they will initially have a generally octagonal shape as shown in solid lines in FIG. 10 because of the various fold lines 11 which divide the housings into eight different panels 12. However, due to the fact that the housings are made out of an organic membrane which is relatively flexible, the housings will take on a generally cylindrical shape as shown in phantom lines in FIG. 10 as the bins are partially filled up with compostable waste materials.

The number of aeration holes 7 in the bins 1 could of course be varied within certain limits. However, it is preferred that the aeration holes only be provided in the lower half of the bins (i.e., the half closest to the ground when the bins are set up for receipt of compostable waste materials as shown in FIG. 1). In the preferred embodiments disclosed herein, three vertically spaced apart holes 7 are provided in the approximate vertical center of each panel 12, each approximately ¾ inch in diameter, with the lowermost holes being located approximately four inches from the bottom edge of the bin, the middle holes being located approximately nine inches from the bottom edge, and the uppermost holes being located approximately fourteen inches from the bottom edge. This means that where the overall height of the bins is approximately 32 inches as previously described, the uppermost holes 7 are located approximately two inches below the middle height of the bins.

To set up one or more bins constructed in accordance with the present invention for composting lawn and garden waste materials and the like is a simple matter, in that all the homeowner need do is pop one or more of the folded bins open at a convenient location where they will remain during the full composting season. The bins should be placed on well drained, level ground so moisture and microorganisms can move up into the bins. Also, the bins should be placed with the aeration holes 7 closest to the ground as shown in FIG. 1.

Using a good mixture of organic materials high in carbon such as leaves with other organic materials high in nitrogen such as grass accelerates the composting process. Also, shredding or chopping the organic materials before packing them into the bins will cause them to decompose faster.

In the Fall a homeowner usually has more leaves than grass. Since both are needed for composting, it is recommended that a new bin be used to store leaves (and dead plants) until they can be mixed in with grass clippings the next Spring and Summer. That way the homeowner will have a place to store the leaves in the Fall and get rid of the grass clippings the next Spring and Summer, and end up with compost for the garden the following Spring.

Since each bin is desirably only approximately 32 inches high, the leaves to be stored therein are easily packed down with the homeowner's feet. Adding a gallon of water for every foot of leaves also helps pack them down, as does running the leaves over with a lawn mower prior to placing them in the bin. Also, mixing cow manure and/or cotton seed meal with the leaves helps them to decompose easier. After approximately a week, the leaves will pack down sufficiently to provide room for adding more leaves to the bin. The pile of leaves can also be covered with a light layer of soil so that the top layer of leaves does not blow off during the Winter.

In the Spring, if the homeowner used a compost bin 1a to store leaves 2a over the Winter, it is desirable to set up a new bin 1b next to the old bin 1a so leaves 2a from the old bin 1a can be used to layer the new grass clippings 2b in the new bin 1b as schematically shown in FIG. 11. For best results, a layer of approximately two to three inches of leaves should be added every time a layer of approximately four to six inches of new grass clippings are added. If the homeowner does not have any leaves available, two to three inches of hay or straw or one to two inches of shredded paper or sawdust can be added for every four to six inches of grass clippings. By the same token, if the homeowner does not have enough grass clippings to mix with the leaves stored from last Fall, cotton seed meal and dehydrated cow manure can be used as grass substitutes.

The homeowner should also make sure the compost pile within the bins does not dry out too much. During the Spring and Summer, the homeowner should try to keep the pile about as moist as a wrung-out sponge. As a rule of thumb, the compost pile should be watered as often as the lawn is watered. It also helps to turn the compost pile every two weeks or so using a spade, shovel, pitchfork or compost turning tool.

If the compost pile is not fully composted by Fall, the compost pile can be left in the bin through the Winter until it is fully composted for use in gardens and flower beds the following Spring or Summer. To use the compost, it can either be removed through the open top of the bins or the bins can be torn away from the compost pile for ease of spreading as desired. The old compost bins left over from the previous year can also easily be disposed of simply by tearing them up into smaller pieces and throwing them into a new compost bin where they will quickly decompose.

From the foregoing, it will now be apparent that the compost bins of the present invention provide a relatively inexpensive and effective way of composting lawn and garden waste materials. Also, the bins can be made from renewable or recycled materials, and unlike all other bins which eventually have to be discarded in landfills, the bins of the present application can be turned into compost and utilized as a soil enrichment material. Moreover, by virtue of their design, the compost bins of the present invention take up very little storage space, and are easy to ship and set up.

Although the invention has been shown and described with respect to certain preferred embodiments, it is obvious that equivalent alterations and modifications will occur to others skilled in the art upon reading and understanding of the specification. The present invention includes all such equivalent alterations and modifications, and is limited only by the scope of the claims.

What is claimed is:

1. A biodegradable compost bin comprising a a housing means having opposite open ends, one of said ends being adapted to be positioned on a supporting surface such that said housing means forms an enclosure for receipt of compostable yard waste materials through the other of said open ends, said housing means being made out of an organic membrane means having a water vapor transmission rate that allows sufficient water vapor to escape from the compostable yard waste materials adjacent an interior surface of said membrane means after the compostable yard waste materials within said enclosure have been saturated with water to keep said membrane means substantially intact throughout a full composting season.

2. The compost bin of claim 1 wherein said water vapor transmission rate of said membrane means is such as to prevent water vapor from escaping from the compostable yard waste materials located further inwardly of the interior surface of said membrane means through said membrane means.

3. The compost bin of claim 2 wherein the water vapor transmission rate of said membrane means is such that the moisture content of said membrane means is reduced to approximately 20% or less within a few hours after the compostable yard waste materials within said enclosure means have been saturated with water.

4. The compost bin of claim 1 wherein said membrane means is made of paper having a pound weight of between approximately 50 and 90.

5. The compost bin of claim 4 wherein said membrane means is made of linerboard having a pound weight of between approximately 60 and 90.

6. The compost bin of claim 5 wherein said linerboard has a pound weight of approximately 90.

7. The compost bin of claim 1 wherein the enclosure formed by said housing means is substantially cylindrical in shape when filled with compostable waste materials.

8. The compost bin of claim 7 wherein the enclosure formed by said housing means has a height to diameter ratio of approximately 1.

9. The compost bin of claim 7 wherein the enclosure formed by said housing means has a height of approximately 32 inches and a diameter of approximately 34 inches.

10. The compost bin of claim 1 wherein said membrane means is made of paper that comes off a paper making machine in a machine direction, said paper being cut such that the machine direction of the paper extends in a direction generally circumferential of the open ends of said housing means around the periphery of said housing means.

11. The compost bin of claim 1 wherein said housing means is made of a single sheet of paper having end portions joined together.

12. The compost bin of claim 11 wherein said end portions are adhesively joined together in overlapping relation.

13. The compost bin of claim 11 wherein said sheet has a plurality of spaced apart fold lines extending generally perpendicular to opposite side edges of said sheet thus dividing said sheet into a series of interconnected panels which are foldable together to facilitate storage and shipment of said housing means.

14. The compost bin of claim 13 wherein there are two spaced-apart fold lines between two of said panels to provide a fold therebetween having a width sufficient to accommodate all of the other panels between said two panels when all of said panels are folded together to facilitate storage and shipment of said housing means.

15. The compost bin of claim 13 wherein a first panel portion at one end portion of said sheet and each successive panel are foldable together in accordion fashion from said one end portion toward the other end portion and a last panel portion at the other end portion is foldable back against the first panel portion and adhesively bonded thereto in overlapping relation for ease in joining the end portions of said sheet together as well as facilitate storage and shipment of said housing means.

16. The compost bin of claim 15 wherein there are two spaced apart fold lines between said last panel portion and the next to last panel to provide a fold therebetween having a width sufficient to accommodate all of the other panels between said next to last panel and the panel formed by adhesively joining said first and last panel portions when all of said panels are folded together to facilitate storage and shipment of said housing means.

17. The compost bin of claim 15 wherein additional fold lines are provided adjacent the end portions of said sheet to prevent any stress build-up in the adhesive joint at the end portions of said sheet.

18. The compost bin of claim 15 wherein said sheet is approximately 32 inches wide and 100 inches long, and said first and last panel portions are overlapped approximately two inches and adhesively joined together after all of the panels are folded together.

19. The compost bin of claim 18 wherein said sheet comprises eight panels including the panel which is formed by adhesively joining said first and last panel portions together.

20. The compost bin of claim 11 wherein said end portions are joined together by stitching said end portions together.

21. The compost bin of claim 20 wherein said sheet has a plurality of spaced-apart fold lines extending generally perpendicular to opposite side edges of said sheet thus dividing said sheet into a series of interconnected panels which are foldable together to facilitate storage and shipment of said housing means.

22. The compost bin of claim 21 wherein a first panel at one end portion of said sheet and each successive panel are foldable together in accordion fashion from said one end portion toward the other end portion and a last panel at the other end portion is foldable back against the first panel, and said first and last panels are slightly longer than the other panels to provide protruding ends when said panels are folded together as aforesaid which are stitched together.

23. The compost bin of claim 22 wherein additional fold lines are provided in said sheet spaced from the end portions of said sheet a distance slightly greater than said stitching to minimize the strain on said stitching as said housing means is opened up to form a bin.

24. The compost bin of claim 1 wherein a plurality of aeration holes are provided in a lower portion of said housing means to assist in the drying out of said lower portion and aid in aerating the interior of said enclosure.

25. The compost bin of claim 24 wherein said aeration holes are confined to the lower half of said housing means.

26. The compost bin of claim 25 wherein the enclosure formed by said housing means is substantially cylindrical in shape when filled with compostable yard waste materials and has a height of approximately 32 inches and a diameter of approximately 34 inches, and said aeration holes have a diameter of approximately $\frac{3}{4}$ inch.

27. The compost bin of claim 25 wherein there are a plurality of rows of said aeration holes in the lower half of said housing means extending substantially all the way around said housing means.

28. A biodegradable compost bin comprising housing means having opposite open ends, one of said ends being adapted to be positioned on a supporting surface such that said housing means forms an enclosure for receipt of compostable yard waste materials through the other of said open ends, said housing means being made out of a one piece organic membrane means having end portions joined together, said membrane means having a water vapor transmission rate that allows sufficient water vapor to escape from the compostable yard waste materials adjacent an interior surface of said membrane means after the compostable yard waste materials within said enclosure have been saturated with water to keep said membrane means substantially intact throughout a full composting season, said membrane means having a plurality of spaced apart fold lines extending generally perpendicular to opposite side edges of said membrane means thus dividing said membrane means into a series of interconnected panels which are foldable together to facilitate storage and shipment of said housing means.

29. The compost bin of claim 28 wherein there are two spaced-apart fold lines between two of said panels to provide a fold therebetween having a width sufficient to accommodate all of the other panels between said two panels when all of said panels are folded together to facilitate storage and shipment of said housing means.

30. The compost bin of claim 28 wherein a first panel portion at one end portion of said membrane means and each successive panel are foldable together in accordion fashion from said one end portion toward the other end portion and a last panel portion at the other end portion is foldable back against the first panel portion and adhesively bonded thereto in overlapping relation for ease in joining the end portions of said membrane means together as well as facilitate storage and shipment of said housing means.

31. The compost bin of claim 28 wherein a first panel at one end portion of said membrane means and each successive panel are foldable together in accordion fashion from said one end portion toward the other end portion and a last panel at the other end portion is foldable back against the first panel, and said first and last panels are slightly longer than the other panels to provide protruding ends when said panels are folded together as aforesaid which are stitched together.

* * * * *